United States Patent [19]
Barker

[11] 3,862,681
[45] Jan. 28, 1975

[54] CONVEYING ARRANGEMENT FOR CONTAINERS

[76] Inventor: Maynard C. Barker, 10906 Ridgedale Rd., Temple Terrace, Fla. 33617

[22] Filed: June 4, 1973

[21] Appl. No.: 367,017

Related U.S. Application Data

[60] Division of Ser. No. 288,447, Sept. 12, 1972, abandoned, which is a division of Ser. No. 147,682, May 28, 1971, Pat. No. 3,703,953, which is a continuation of Ser. No. 788,136, Dec. 31, 1968, abandoned.

[52] U.S. Cl............... 198/50, 198/137, 198/162, 198/165
[51] Int. Cl............................................. B65g 47/00
[58] Field of Search........................ 198/162–165, 198/204, 171–174, 137, 41, 50, 160

[56] References Cited
UNITED STATES PATENTS

| | | | |
|---|---|---|---|
| 1,306,586 | 6/1919 | Duke | 198/165 |
| 1,493,382 | 5/1924 | Priem | 198/162 |
| 1,911,961 | 5/1933 | Melnick | 198/162 |
| 2,784,832 | 3/1957 | Thomson | 198/165 |
| 2,896,943 | 7/1959 | Lewi | 198/162 |
| 3,272,313 | 9/1966 | Sarovich | 198/41 |
| 3,282,402 | 11/1966 | Ayres | 198/137 |
| 3,447,663 | 6/1969 | Sarovich | 198/41 |
| 3,754,635 | 8/1973 | Mojden | 198/41 |

Primary Examiner—Evon C. Blunk
Assistant Examiner—Jeffrey V. Nase
Attorney, Agent, or Firm—Patrick J. Walsh

[57] ABSTRACT

A container-conveying arrangement is disclosed, having an endless guided conveyor chain with replaceable chain-guiding and container-engageable conveying caps or pads forming an articulated shingled or saw-toothed conveying surface. The basic conveyor chain and cap assembly is disclosed in several container-conveying embodiments, namely a container elevator, a container lowerator or lowering conveyor, and a horizontal container conveyor, the elevator and lowerator each having two opposed parallel conveyor chains with interfacing shingled conveying caps forming opposed articulated saw-toothed conveying surfaces, and the horizontal conveyor having a single length of endless chain with shingled caps forming an articulated saw-toothed generally horizontal conveying surface.

36 Claims, 30 Drawing Figures

CONVEYING ARRANGEMENT FOR CONTAINERS

This is a division of application Ser. No. 288,447 filed Sept. 12, 1972, now abandoned, which is a division of application Ser. No. 147,682 filed May 28, 1971, now U.S. Pat. No. 3,703,953, which is a continuation of application Ser. No. 788,136 filed Dec. 31, 1968, now abandoned.

This invention relates to container conveying devices, and more particularly to conveying arrangements for cans or other similar containers, being of especial value in the conveying of filled or partially filled cans which are desired to be raised or lowered, or to be moved horizontally or in some conbination of vertical and horizontal movement from one location to another, as in handling and processing cans during manufacture or subsequent manipulation thereof in various process operations.

In the container industry, and particularly the can handling and processing industry, there has existed a need for a more positive and effective apparatus for moving a can or other container in the filled state. A can which is completely filled with non-homogeneous material or which is only partially filled, as is very often the situation, is relatively unstable in its weight distribution, due to the uneven and easily shiftable distribution of the contents, especially in the case of liquid, particle, or combined liquid and particle material. In addition, the substantial added weight of the contents relative to that of an empty can presents an added problem which must be overcome in effectively conveying full cans as distinguished from the lighter weight empty cans.

Various methods and apparatus have been employed to solve these problems with varying degrees of success, including end grip elevators and lowering apparatus employing generally rough surfaced opposed endless belts. These belt type friction gripping apparatus leave much to be desired, due to their lack of positive conveying control action and their own self-added problem of container contamination, especially when handling unsealed containers, the lack of adequate positive conveying control action on filled cans often being particularly troublesome. In addition, various chain conveyors have been developed, including chains with a flat articulated conveying surface formed by flat topped articulated conveying elements, of crescent, rectangular, and other plan configurations, secured to or formed on the links. These various flexible or articulated flat surfaced conveyors have met with some substantial degree of success, but have left much to be desired in the way of more positive conveying action on the cans, and especially filled cans.

It is accordingly a major feature of this invention to provide a container conveyor arrangement of the end engaging type which is more positive in conveying action on the cans or other containers, yet which permits the conveyor to continue to run without damage in the event of jam-ups or stoppages of flow of the containers.

It is a further feature to provide a conveyor arrangement which provides a desired degree of positive conveying action while reducing the surface contamination problem, particularly as compared to rough surfaced belt conveyors.

Still another feature is the provision of a chain conveyor arrangement which provides an articulated saw-toothed conveying surface formed of individual-link-carried conveying caps which are individually easily removable and replaceable.

A further feature lies in the provision of end gripping elevator and lowering arrangements which operate on the end gripping principle, and which provide a desired degree of positive container conveying control.

Another feature is a conveyor chain arrangement employing standard chain links which may preferably be of the roller type, and which incorporates replaceable conveying caps which may be replaced without removal of the securing element or elements holding the chain link pins in place, and in one embodiment without removal or unsecuring of the chain connecting mounting pin for the caps, thereby enabling more easy replacement of the conveying and replacement of such caps at otherwise difficult or impossible replacement zones.

It is a still further feature to provide an articulated capped chain conveyor arrangement employing removable and replaceable wear strip guides for bearing and guiding engagement by the caps, the wear strip guides having mirror-reversible bearing and guiding surfaces for engagement by the caps and for guided spaced suspension of the chain therebetween.

A further feature is the provision of a container lowering arrangement of the end-gripping type and which provides for a desirable degree of positive conveying action along its conveying path, including a down-flow conveying run, while providing for substantially positive blocking of dropping or falling of the containers through the down-flow run, as during operation or in the stopped condition of the conveyor, such being of particular importance and value in the lowering conveying of filled cans which in the absence of positive control are very prone to sliding and falling along and through a down-run as in the prior friction belt lowering apparatus.

Still other objects, features and attendant advantages will become apparent to those skilled in the art, from a reading of the following detailed description of several physical embodiments constructed in accordance with the invention, taken in conjunction with the accompanying drawings, wherein.

Figure 1:
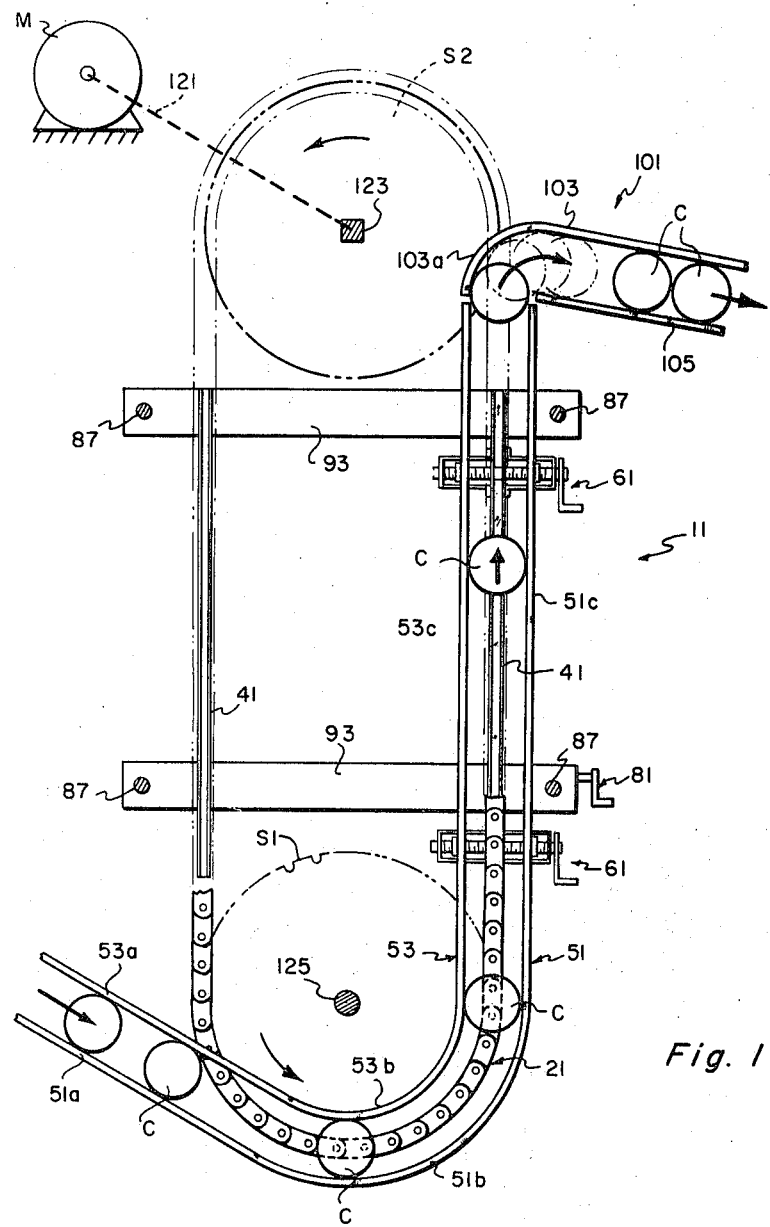
FIG. 1 is a schematic elevation illustration of an elevator according to the invention.

Referring now in detail to the Figures of the drawing, in the elevator 11 as shown in FIGS. 1–15, cans C are raised from a first lower inflow zone to a higher exit zone through the medium of a pair of flexible endless loop chain and cap assemblies generally indicated at 21. Cans C are fed into the entrance zone formed by the lower arcuate run of the chain and cap assemblies 21, as by a gravity chute 51a, 53a, 55, which may lead from any desired input device such as the exit chute from a preceeding can processing or handling machine. The cans are end-gripped between the interfacing caps 31, 33 of the chain and cap assembly 21 and moved arcuately upwardly along and between guides 51b, 53b and thence vertically upwardly between the guides 51c, 53c to an exit zone where they are removed by path interference curved cam guides 103a and discharged into a further gravity chute 103, 105, from whence they may be guided or conveyed to or through other handling, storing, or processing apparatus as desired.

The endless chain and cap assembly 21 is preferably formed by a roller chain 23, with replaceable tapered or inclined surfaced caps 31, 33 secured to the chain 23 through the medium of the mounting pins 29 (See FIGS. 7 and 8) which extend through link-connecting bushings 26, and these two endless articulated assemblies are each guided about a respective two spaced sprocket wheels S1 and S2 and along spaced parallel channel guides 41 in the vertical runs between the sprocket wheels S1 and S2. Driving of the conveying chain and cap assemblies 21 is effected through upper coaxial sprockets S2 as by a motor M and suitable drive connection 121, which may include a speed reducer if desired, to the splined or square drive shaft 123 on which the sprocket wheels S2 are axially adjustably mounted.

Figure 3:
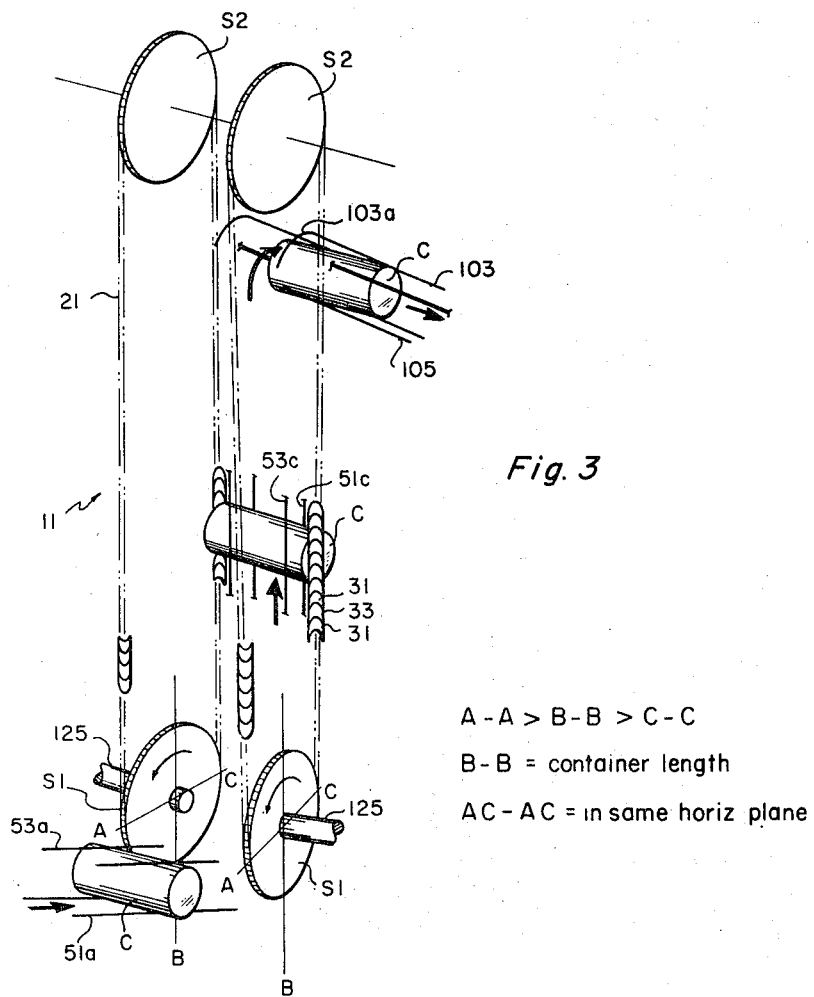
FIG. 3 is a diagrammatic illustration of the container flow relationships of the embodiment of FIGS. 1 and 2.
Figure 4:
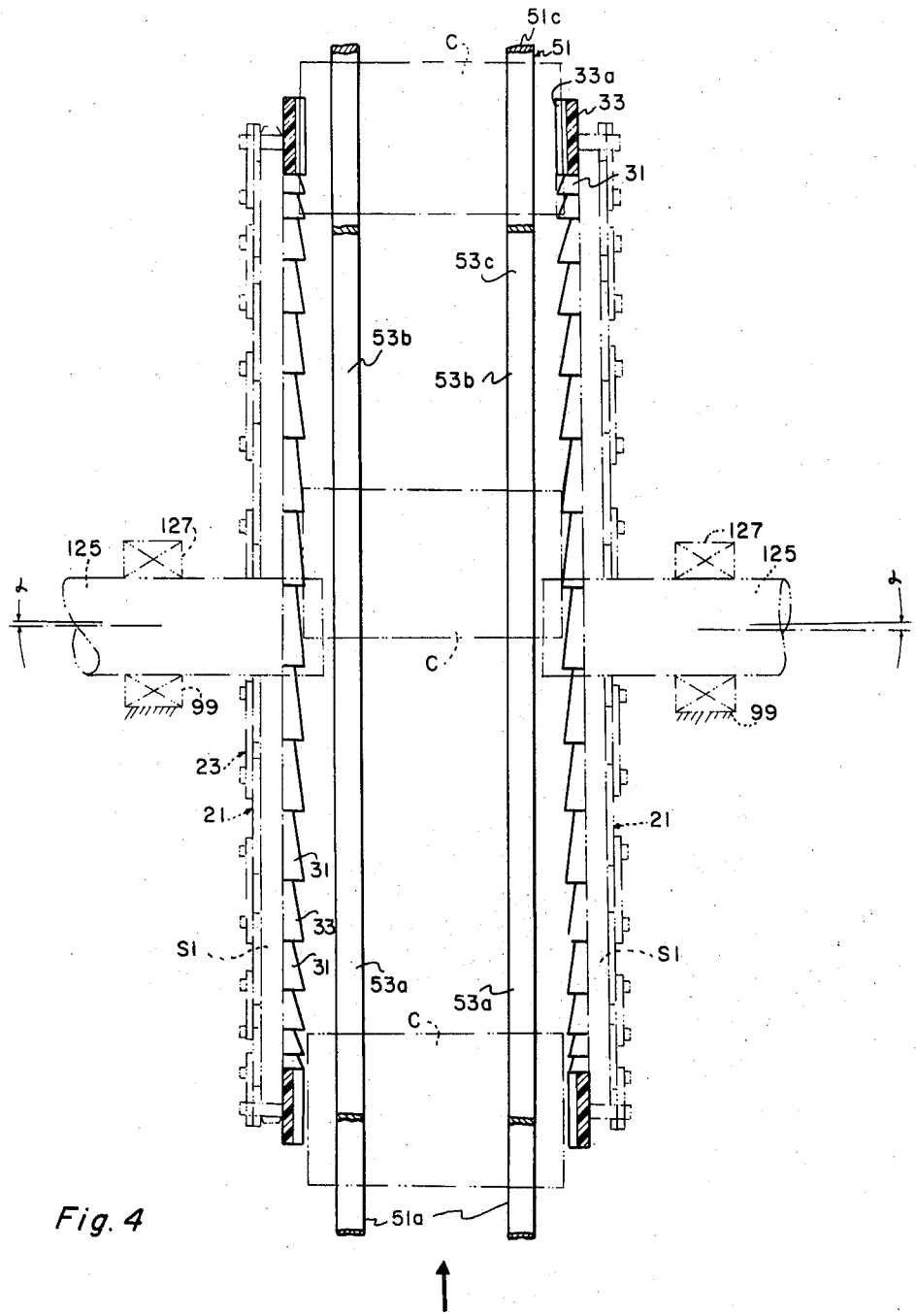
FIG. 4 is a schematic illustration in diameteral plan section through the lower sprocket wheels, of the inflow zone of the elevator of FIGS. 1 and 2, in the zone of the lower sprocket wheels and conveyor chain and caps guided thereby.

The lower entrance sprockets S1 are mounted on idler shafts 125 which ride in bearings 127, and the shafts 125 are each canted by a small angle α, as for example approximately 3°–5°, relative to and substantially directly below the axis of shaft 123 for sprockets S2, so as to cant or splay the sprocket wheels S1 open at the entrance side as indicated in FIGS. 3 and 4. As viewed in FIG. 3, the sprocket wheels S1 are adjusted and set as by screws on their shafts 125 such that the inner distance between the trailing edges of interfacing caps 31, 33 at zone A—A is a small amount greater than the length of a can or other container to be conveyed, the distance at C—C is less than the can length by an approximately equal amount, and the distance at B—B is equal to the can length. Thus, as the cans enter through gravity chute 55, 51a, 53a, and proceed down between arcuate guides 51b, 53b, they pass freely between the two arcuate rows of interfacing caps or pads 31, 33 on chain and cap assemblies 21 in the zone between A—A and B—B, and at the bottom of the arc of travel along guides 51b, 53b they are gripped at their ends between the respective opposing caps 31, 33 as indicated schematically in FIG. 3, and continuingly greater action is effected between zone B—B and zone C—C, where the chain and cap assemblies leave the sprocket wheels S1 and the straight vertical lift run of the cans C begins. Dependent upon the containers C being conveyed, both in structure and in material of the containers C, the amount of end pinching or clamping action may be varied, it having been found, for example, in one illustrative general purpose embodiment that a satisfactory pinching or clamping action on conventionally beaded metal cans can be effected by making the cap interface distance at C—C less than the distance at A—A by approximately one-fourth inch, the cap trailing edge interface distance thereby being approximately one-eight inch less than the can length at the zone C—C and along the vertical run between guides 41 to the exit zone and adjacent sprocket wheels S2. More or less pinching or clamping action may be effected asdesired or necessary by varying the angle α for given sized sprocket wheels S1. A small, yet effective, degree of elastic resilience is advantageously afforded between the opposed caps 31, 33 in their clamp or pinch gripping action by forming the caps of a suitable wear and creep resistant and relatively rigid material which is of relatively low durometer particularly as compared to steel and other similar structural metals (e.g., a durometer of approximately 50–55 is satisfactory and advantageous), so as to provide a small, yet effective, amount of conveying surface yielding action, suitable materials including resins or other plastics such as polyurethane, nylon, or Delrin acetal resin, or fiber-filled or other suitably filled combinations of such plastics, or other suitable materials may be employed as may be desired, a dual material combination modification being further described at a later point in this description.

Figure 2:
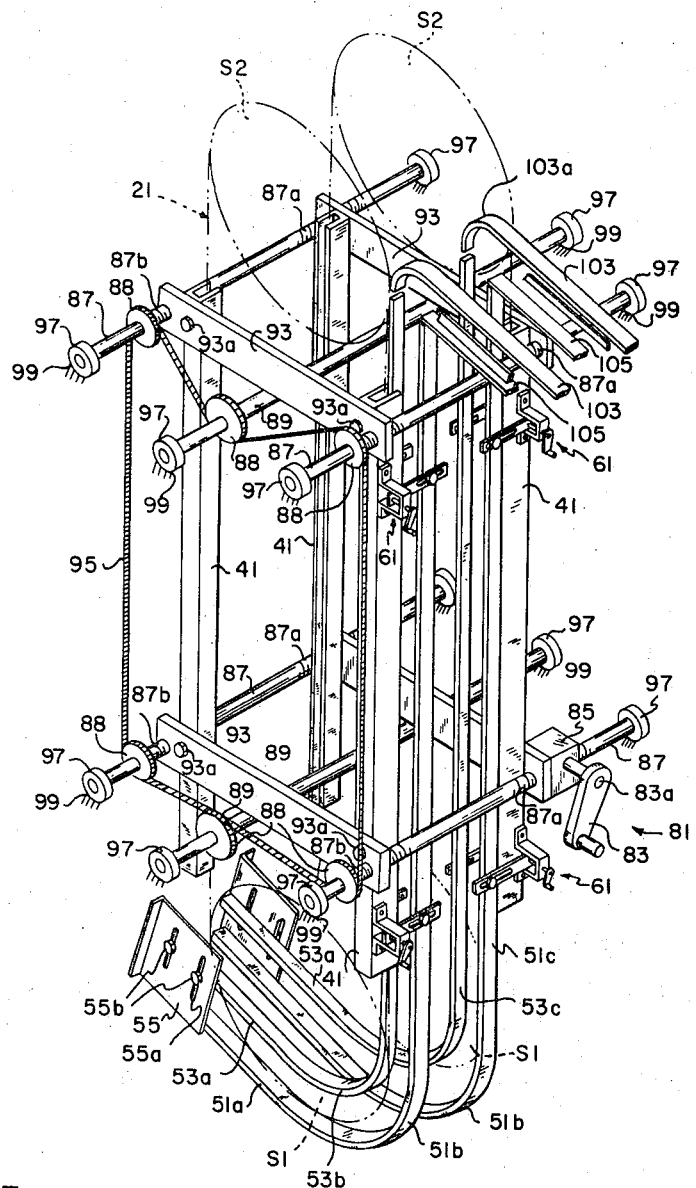
FIG. 2 is a perspective schematic view of the embodiment of FIG. 1, the sprocket wheels and chain and cap assemblies being only indicated in diagrammatic phantom for clarity of illustration.

Varying sized cans or other containers, may be accommodated, can length adjustments being made by a length adjustment device indicated generally at 81 and including four parallel shafts 87, each of which has two spaced oppositely threaded sections 87a, 87b on which are threadedly mounted cross plates or bars 93 to which are secured vertical channel guides 41 as by screws or bolts 93a (see FIG. 2). These shafts 87 and intermediate idler shafts 89 are rotatably mounted in bearings 97 supported on a suitable frame 99 which also may suitably support all of the other portions of the elevator, such as the can guides, the sprocket wheels, and motor drive arrangement. Connecting the shafts 87 is chain 95 which engages small sprocket wheels 88 secured on the respective shafts 87 and 89, although the sprocket wheels on shafts 89 may be free, and the shafts 89 fixed, if desired. Mounted on one of the cross bars or plates 93 and in driving connection with the adjoining screw shaft 87 is a right angle screw drive 85 having an input shaft 83a with a manual handle 83 secured thereto for selected manual rotation of the shafts 87 and consequent lateral adjustment of the channel guides 41, thereby adjusting the adjacent vertical runs of the chain and cap assemblies 21. The sprocket wheels S1 and S2 may be adjusted as by axial sliding of sprockets S1 on shafts 125 and resetting the sprocket-securing set screws or other securing means therefor, whereas sprockets S2 may be either similarly reset and set screw secured or may be permitted to seek their own axial position on the square common drive shaft 123 as determined by the lateral spacing of guides 41 and the passage of the chain and cap assembly 21 thereabout. Can length adjustment may also necessitate or render desirable sideways lateral readjustment of the can circumference guides 51, 53, both at the gravity infeed 51a, 53a, 55 and along the lower arcuate and vertical portions thereof 51b, 53b, 51c, 53c.

As later described in more detail, lateral adjustment slots 71a in guide support plates 71, in conjunction with securing screws 73 and associated threaded plate nuts 75 (see FIG. 15) enable desired sideways lateral adjustment of vertical guide sections 51c, 53c, and similar adjustment of the entrance guide sections 51a, 53a, 51b, 53b may be effected by spreading or narrowing the bracket plate guides 55, whereas the exit guides 101, 103 may likewise be widened or narrowed as by sideways spacing adjustment of or on their respective supports (not shown).

Diameter adjustments may be effected by adjustment of entrance guides 51a, 53a closer or further apart as appropriate, through vertical adjustment of the vertical mounting position of bracket guides 55 and relative adjustment movement of guides 53 along adjustment slots 55a in bracket guides 55; by spacing adjustment of vertical guides 51c, 53c through the four guide adjustment units generally indicated at 61 (see FIGS. 2 and 15); and unless guides 101 and 103 are suitably fixedly positioned with a suitably oversized can diameter spacing, then these guides 101, 103 may similarly be relatively adjusted as by adjustment of their supporting elements (not shown) which may also include in or out shifting of the guides 103 with their associated path interference curved cam guides 103a relative to the path of chain and cap assemblies 21. It will, however, be noted that by constructing the curved can removal cam 103a and discharge guide chute 103, 105 of sufficient diameter-accommodating oversize it may not be necessary to make any adjustment to these elements.

Figure 15:
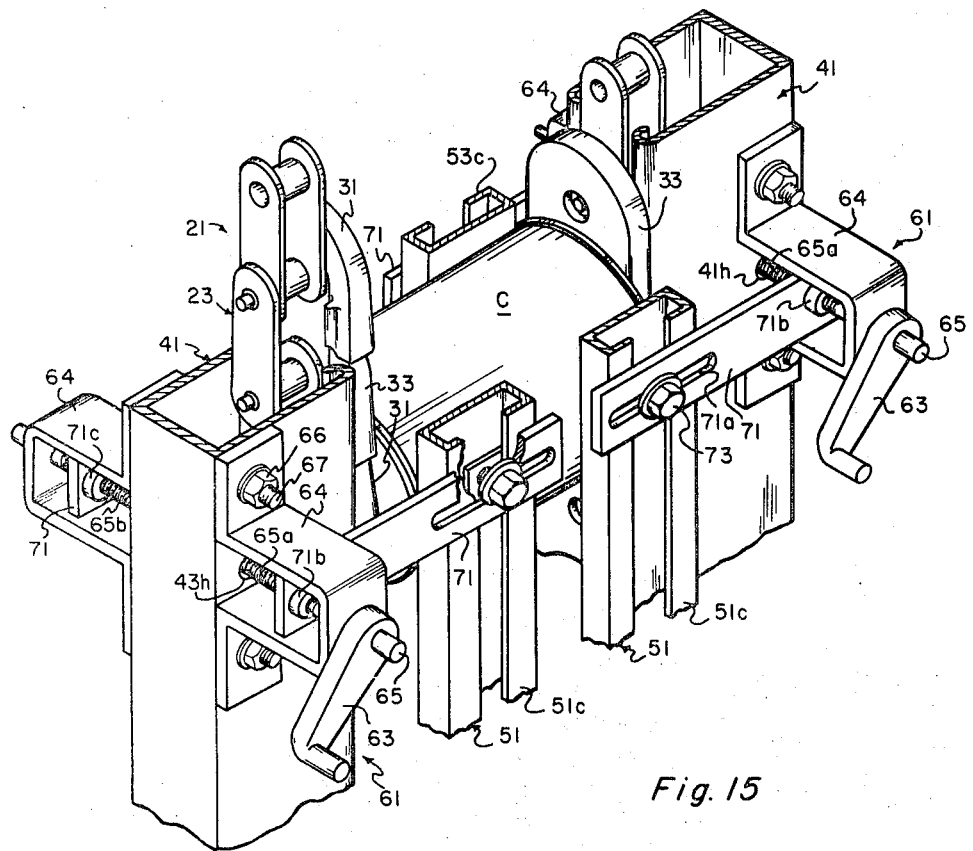
FIG. 15 is an enlarged fragmentary view, in more detail, of the can diameter adjustment arrangement.

Referring to FIGS. 2 and 15, the guides 51, 53 are selectively adjustably mounted for variation of lateral sideways and can diameter accommodating spacing, the guides 51, 53 being slidably adjustably mounted as by screws 73 and threaded plate nuts 75 on cantilever plates 71, slots 71a enabling selected sideways adjustment. Cantilever plates 71 are in turn threadedly mounted as by threaded bosses 71b thereon which threadedly engage the respective oppositely threaded sections 63a, 63b of diameter adjustment shafts 65 which are manually rotated by hand cranks 63 to set the vertical sections 51c, 53c of guides 51, 53 to a desired diameter setting, it being noted that the front and back adjustment of these guides 51c, 53c is thereby achieved equally relative to the center line of the path of chain and cap assembly 21 along channel guides 41, thus providing for centered conveying of the containers C by the conveying caps 31, 33, within the range of possible adjustment.

Figure 7:
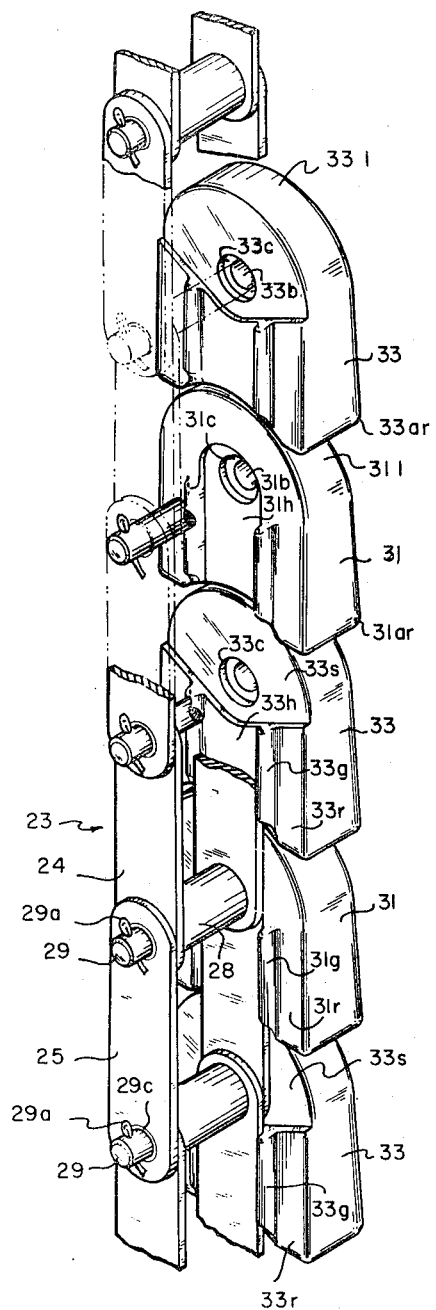
FIG. 7 is a perspective view in partial section and partial phantom line for clarity of an illustrative section of the conveying chain and cap assembly.
Figure 8:
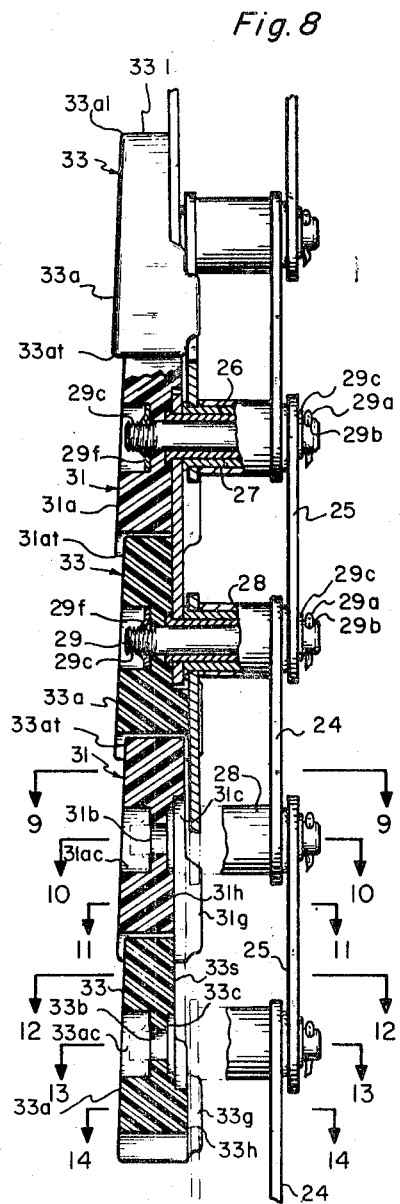
FIG. 8 is a side view in partial longitudinal center section of the section of conveying chain and cap assembly of FIG. 7.
Figure 9:
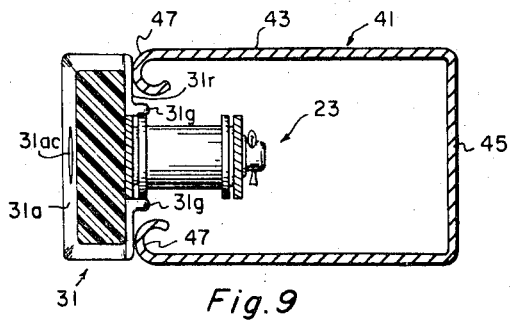
FIGS. 9–14 are section views taken respectively on lines 9—9 through 14—14 of FIG. 8.
Figure 12:
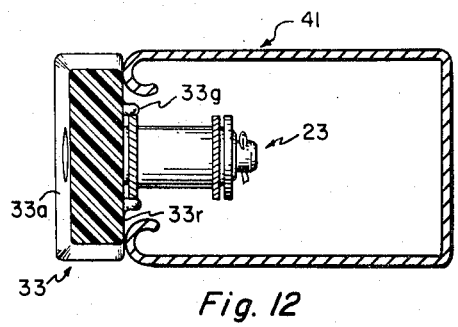
Figure 10:
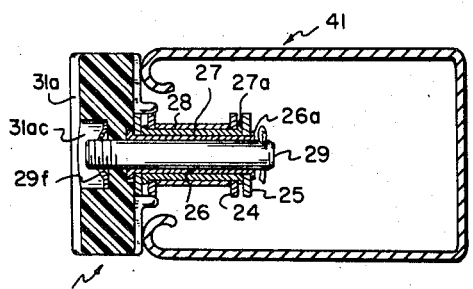
Figure 13:
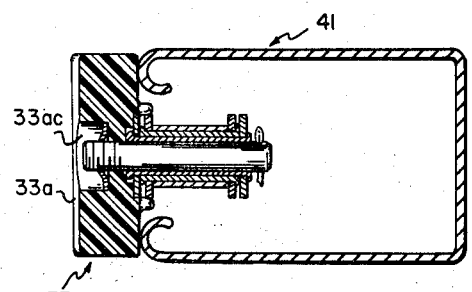
Figure 11:
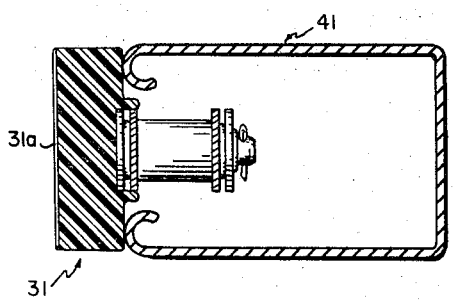
Figure 14:
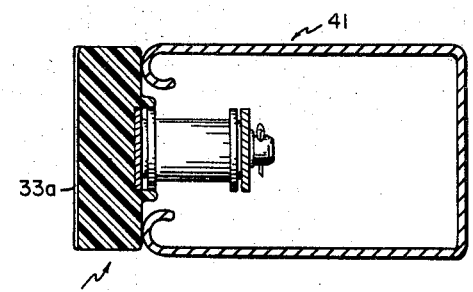

The endless loop conveyor chain and cap assemblies 21 and their guided relation with channel guides 41 are shown in more detail in FIGS. 6–14. Each endless loop conveyor chain and cap assembly 21 is made up of an endless loop of chain 23 to which replaceable container conveying caps are removably secured against and rest contiguously on the outer face of the respective adjacent link plates 24, 25 of the chain 23. Chain 23 is preferably a roller chain and may be of generally standard construction as shown in FIGS. 7 and 8, including alternate pairs of roller link plates 24 and pin link plates 25 with lip-rolled ended (as shown) or force fit connecting bushings 26 and 27, and having cap mounting and securing pins 29 mounting and securing the caps 31, 33 to and against respective links 24, 25 of the chain 23.

Figure 25:
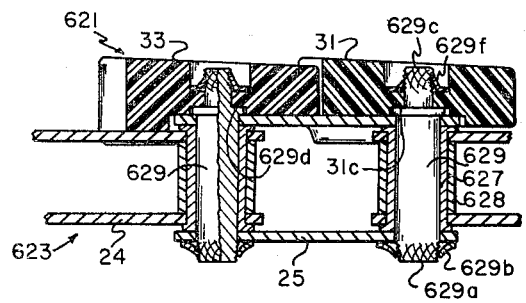
FIG. 25 is a longitudinal section view of a modified chain and cap arrangement, which offers preferred advantages.

The replaceable conveyor caps are formed in two configurations 31 and 33 for complementary interfitting with the respectively directly adjacent link plates 24 and 25 to which they are secured as by pins 29. Each of the caps 31 and 33 has a forwardly tapered or inclined smooth conveying surface 31a, 33a respectively, which, by virtue of the respective thickness configurations of the caps along their longitudinal center zones, provides an endless band discontinuous articulated saw-toothed conveying surface 31a, 33a, 31a, 33a, etc., the leading edges of the sawtoothed surface being closer to the chain 23 than the trailing edges thereof. Caps 31 and 33 each have bores 31b and 33b respectively, through which pins 29 extend for securing the caps to the link plates, pins 29 and caps 31, 33 being removably secured to the chain assembly by suitable end-securing means such as cotter pins 29a passing through transverse bore 29b in pins 29, and speed nuts 29f secured to recessed threaded outer end 29c of pin in the counterbores 31ac, 33ac respectively. While mounting pins 29 may be freely slidably removable in link bushings 26, with retaining cotter pins 29a, these cap mounting pins may alternatively be press fit secured into the bushings 26, thereby enabling ease of removal of the caps 31, 33 from the chain 23 as by unscrewing or breaking speed nuts 29f or breaking and removing the plastic cap desired to be replaced and then removing nut 29f, without removing or freeing pin 29 from the chain 23, this feature being desirable in enabling ease of replacement of the caps 31, 33 at almost any location along the conveyor chain runs without worry about holding the pin 29 during replacement of the cap and speed nut 29f. An alternative chain construction is illustrated in FIG. 25, in which cap mounting pins 629 are formed to combine the structure of pins 29 and link connecting bushings 26 in one integral member having a shoulder flange 629d and threads or knurled serrations or other suitable securing means on its link end 629c, the pin 629 then removably securing links 24 and 25 between shoulder flange 629d and removable speed nut 629b. Thus, the caps 31, 33 may be easily removed as discussed previously by removal of speed nut 629f without disconnecting or unsecuring of mounting and connecting pin 629 from the chain links.

The side walls of the caps 31 and 33 may be suitably parallel or tapered as desired, and the leading and trailing walls are respectively complementarily convexly rounded as indicated at 31–1, 33–1 and have a central complementary concavely rounded wall recess 31tc, 33tc, formed between two generally flat trailing walls 31tf, 33tf, with the trailing wall thus forming a partial skirt wall closely adjacent and about a portion of the convex leading wall 31–1, 33–1 of the respective adjacent trailing cap. The edges of the conveying surfaces 31a, 33a are rounded, thereby tending to prevent chipping of the edges and providing for more smooth container engagement by the cap conveying surfaces 31a, 33a.

The counterbore recesses 31ac, 33ac also serve, in addition to their function as a recess for the speed nuts 29f and pins 29, the additional function of an added conveying edge surface at the side and trailing junction of the counterbores 31ac, 33ac with the respective inclined conveying surfaces 31a, 33a.

The undersurfaces or back surfaces of the respective conveying caps 31, 33 are formed with side runner bearing surfaces 31r, 33r and raised parallel centering guide walls 31g, 33g for guided engagement with the parallel spaced guiding surfaces 47 formed by the inturned edges of the legs 45 of channel guides 41, and with longitudinal center channels 31h, 33h for receiving and flat contiguous engagement with the facing outer flat surfaces of respective link plates 24 and 25. The distances of these channels 31h and 33h from the tapered or inclined upper conveying surface 31a, 33a of caps 31, 33 is complementary to and determined by the relative lateral position of the adjacent outer flat surfaces of links 24 and 25, so as to provide a continuing saw-tooth surface 31a, 33a of substantially the same height and configuration along the length of the endless band chain and cap assembly 21, independent of the particular cap forming the conveying surface. Also to this end, the forward under surface 33s of cap 33 is recessed to a depth corresponding to the depth of channel 31h, as both caps 31 and 33 rest on chain links 25 at these respective rear and front zones, the recessed surface 33s being open at its forward end, and flared to enable the desired degree of articulated relative motion between the respective link-cap articulated sections 24, 31 and 25, 33. Preferably channel 31h is closed at its forward end to generally conform to the adjacent forward rounded end of link plate 25, although this channel 31h may continue along the entire length of cap 31 underface if desired. Both channels 31h and 33h have counterbore recesses 31c to accommodate the adjacent swaged flanges or lips on the connecting bushings 26 and thereby enable the desired flat interface of the channels 31h, 33h with the chain links 24, 25.

Figure 5:
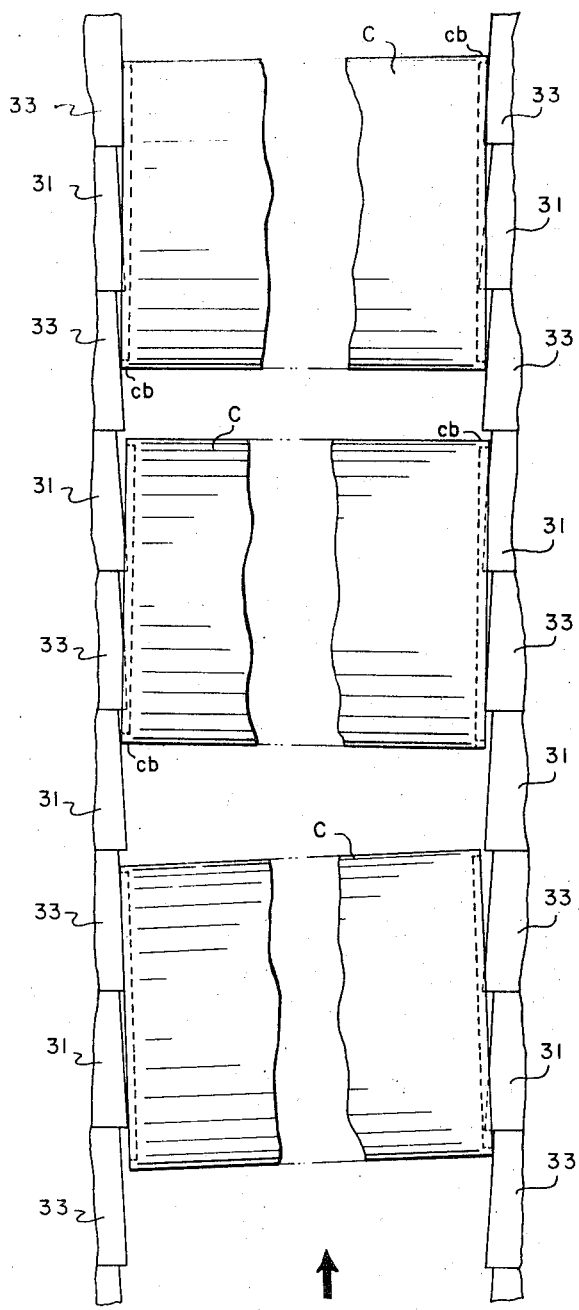
FIG. 5 is a schematic view in front elevation of a fragmentary illustrative section of the elevating run of the conveying caps and cans in the elevator of FIGS. 1 and 2, the conveyor surface saw-tooth depth being exaggerated for purposes of illustration.
Figure 6:
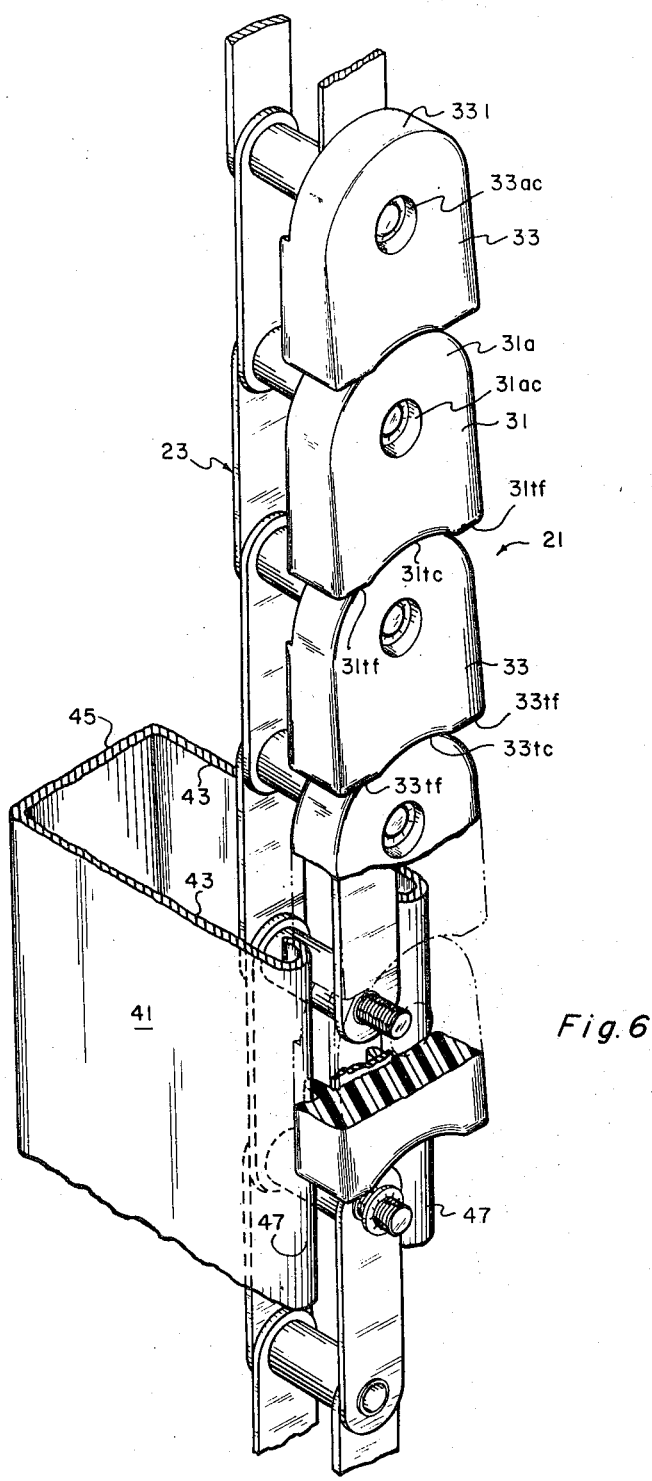
FIG. 6 is a fragmentary perspective view, in partial section, of the conveyor chain, cap and guide arrangement according to the invention.

In FIG. 5 is schematically illustrated various possible holding or clamping positions of the beaded containers C along the vertical lifting run of caps 31, 33 of conveyor chain and cap assembly 21. Thus for the illustrated relative container diameter and length of caps 31, 33 the can may, among other positions, assume the positions illustrated, in which the upper illustrated can C is suspended at its upper and lower bead edges Cb by the central area of caps 33 (or 31 as the case may be), the middle illustrated can C is tilted to the right and is suspended essentially through interengagement between its upper right hand and lower left hand beaded edges Cb and the adjoining opposed upper and lower caps 31 (or 33 as the case may be). The lower illustrated can C is tilted to the left and is likewise suspended between cap surfaces at diagonally spaced beaded edges of the can C. Various clamped and suspended positions of the containers may occur, dependent on various factors including the relative sizes and configurations of the containers C and conveying caps 31, 33, and these clamped positions are only illustrative for the purpose of schematically indicating the ability of the conveying chain and cap assemblies to clamp and generally positively move the containers C from their lower position at B—B (FIG. 3) to their discharge position at the exit chute 103, 105 where the cans are laterally cammed out from between the caps 31, 33 by their running engagement with the curved removal cam 103a (FIGS. 1–3). The containers C may be gripped to a greater or lesser degree, as desired, by changing of the spacing between the interfacing saw-toothed surfaces. The depth of the saw-toothed surfaces is not critical and may be varied to suit specific requirements; however, it is most advantageously desirable and preferred to employ a combination of relatively low cap surface durometer and relatively shallow saw-tooth surface depth for most desirable positive conveying action while enabling the desired ability for continued running without damage when jam-ups or stoppages of container flow occur, a trailing edge/leading edge differential of one thirty-second inch having been found to be satisfactory for general purpose caps 31, 33 of approximately 1¾ inches length and 1½ inches width, and cap durometer of 50–55, as an illustrative example. It will also be appreciated that while the cans C are generally positively clamped between interfacing runs of caps 31, 33, the saw-toothed configuration of the caps 31, 33, and the relative elastic resilience of the plastic caps 31, 33 (as well as to some degree the elastic resilience of the containers C) enables the conveyor chain and cap assemblies 21 to continue to run without damage when there is a jam-up or stoppage of the container flow, as might be caused by difficulties in a subsequent processing apparatus.

Figure 16:
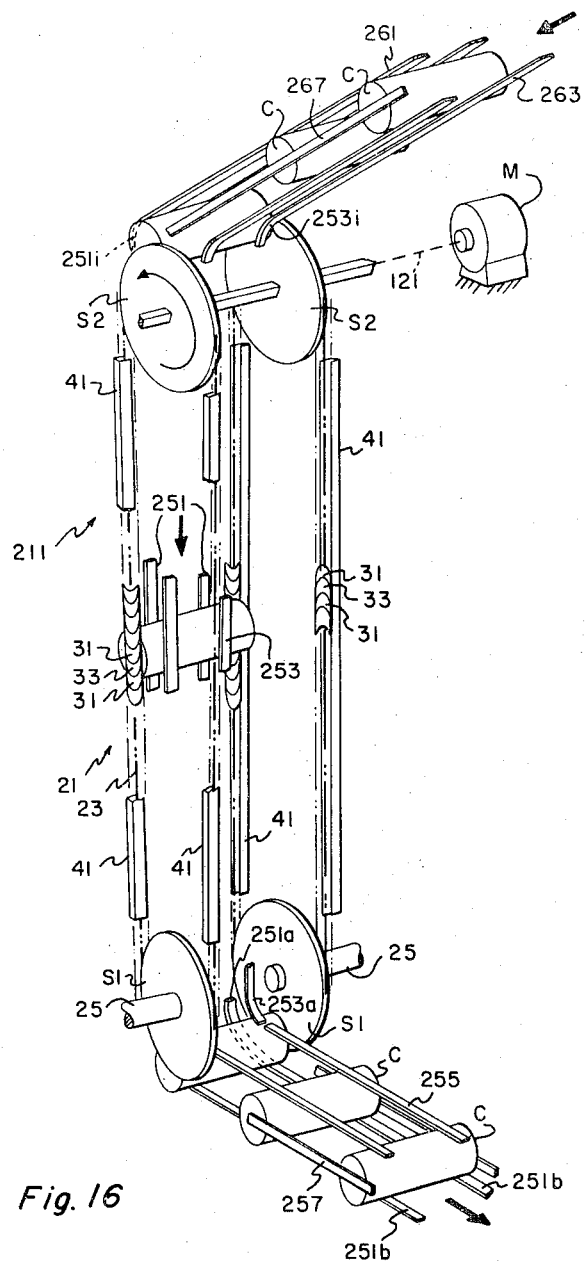
FIG. 16 is a schematic perspective view of a container-lowering arrangement embodiment according to the invention.

In FIG. 16 is shown a lowerator or lowering conveyor generally indicated as 211, the lowerator 211 having essentially the same basic elements and arrangement of parts between and including the sprocket wheels S1, S2, except that the direction of the conveying caps is reversed so as to form a down-flow vertical conveying run into the in-splayed closer spaced diametral zone of the sprocket wheels S1, the convex tapered beading edges of the caps being disposed in the downward direction along this run as indicated in FIG. 16, Suitably supported guides 261, 263, 267 form a gravity feed chute into the parallel arcuate upper run of the caps 31, 33 along drive sprocket wheels S2, which are adjustably axially secured in their drive shaft, the cans being cammed into conveying engagement by the interfacing saw-toothed surfaced arcuate runs of chain and cap assemblies 21 by the gravity feed action thereon from the gravity feed chute 261, 263, 267 and by the in-feeding camming and gripping action exerted by the saw-toothed interfacing conveyor cap surfaces along this arcuate run in conjunction with the infeed downward camming action of the lower end section of upper guide 261 at the entrance feed zone therefrom to the sprocket wheels S1. The arcuate guides 251, 253, including arcuate upper guide sections 251i, 253i, laterally guide the conveyed cans C down between the downward runs of the saw-toothed chain and cap assembly 21 surfaces 31a, 33a, and the cans C thence flow through the lower rear quarter of the chain and cap assembly run along out-splayed sprocket wheels S1, where the cans C are laterally arcuately guided by arcuate guide extensions 251a, 253a. The out-splayed sprocket wheels S1 continue to grip the cans along the lower rear quarter arcuate run therealong, and release the cans at the bottom of the arcuate run. The cans may, however, be aided, if desired, in insurance of removal and exit thereof from sprocket wheels S1 (or may, if desired, be removed without aid of splaying of sprockets S1) by interference camming action exerted on the cans by the inboard extended end of guides 255 of discharge gravity chute formed by guides 251b, 255, 257, thus permitting the cans to be removed before reaching the bottom of the lower rear quarter arcuate run between sprockets S1.

Figure 17:
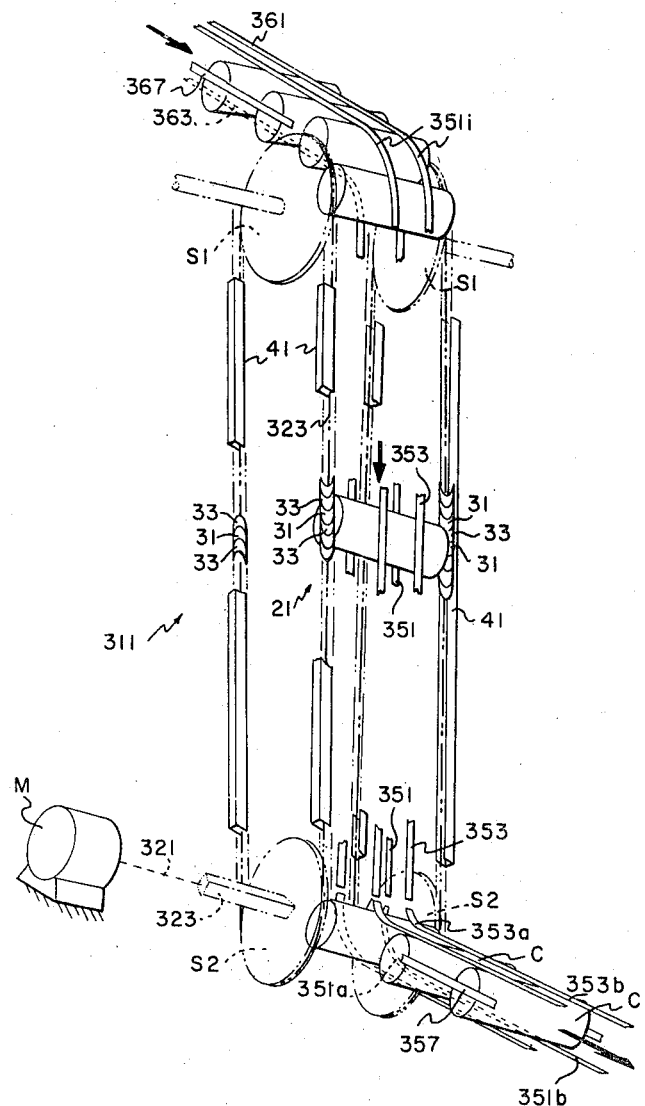
FIG. 17 is a schematic perspective view of a modified lowering arrangement according to the invention.

FIG. 17 illustrates another form of lowerator, in which the inflow sprocket wheels S1 are splayed open at the input side at the upper rear thereof as viewed in the Figure, the lower exit sprocket wheels S2 being parallel and driven by a common shaft 323, and the cans being cammed out into the discharge gravity chute 351a, 351b, 353a, 353b by the path interference camming removal action of the cam guides 351a which extend into the path of the containers between the conveying assemblies 21 and divert the flow of the containers C into the gravity discharge chute, similarly to the in-flow feeding and discharge removal of cans C in the elevator 11 of FIGS. 1–15. However, in this lowerator embodiment, the vertical action run of the conveyor assemblies 21 is downward as in FIG. 16, between guide 351, 353 and 41, 41, and the inflow feeding of cans C is effected into the open out-splayed side of idler sprockets S1 near the upper end of arcuate travel of the conveyor assemblies 21 about sprockets S1, as by a gravity feed guide chute formed by guides 361, 363, 367. The cans are then increasingly clamped between the saw-toothed conveyor runs along the continued upper front arcuate quarter of travel of the conveyor assemblies 21 about sprocket wheels S1 and are in full clamped relation between the opposing cap saw-tooth forming surfaces 31a, 33a as the chain and cap assemblies 21 are moved along their down-flow run between guides 41, 41, with lateral can circumferences guiding being effected by guides 351, 353.

Figure 18:
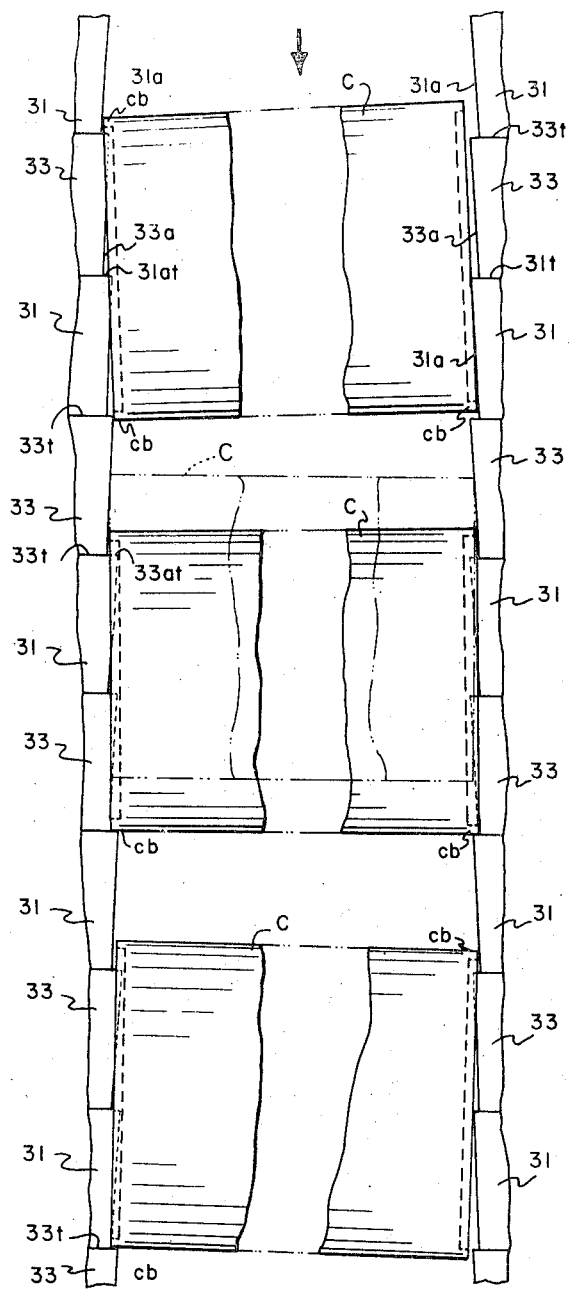
FIG. 18 is a schematic view in front elevation of a fragmentary illustrative section of the lowering or down-flow run of the conveying caps and conveyed cans in the lowering arrangements of FIGS. 16 and 17, the conveyor surface saw-tooth depth being exaggerated for purposes of ease of illustration.

FIG. 18 is schematically illustrates various possible clamped conveying positions of the cans C along the down-flow clamped runs of the chain and cap assemblies 21, with their respective opposed saw-tooth cam surfaces formed by opposed tapered faced caps 31, 33, in each of the lowerator embodiments of FIGS. 16 and 17. It will readily be seen that the cap faces 31a, 33a present their trailing saw-toothed edges 31at, 33at vertically upward, and the upward facing ledges created by the outer edges of the rear faces 31t, 33t thus provide a set of positive acting supports which prevent undesired downward falling of cans along and through the controlled down-flow run of the conveyor assemblies 21. The upper illustrated can C is supported in a tilted position with its upper left bead edge Cb resting against a cap surface 31a and its bead hanging on the trailing edge 33t of the following cap 33 (the engagement being between the bead Cb and the outer trailing flat edge surfaces formed by trailing walls, 33tf, 33tf, the latter being seen in FIG. 6). The lower right bead edge Cb of this upper illustrated can C is clamped against the surface 31a of a cap 31. The middle can C is supported at its leading bead edges by trailing edges 31at, 31at of opposed caps 31, while lower can C is supported at its lower bead edge by the ledge formed by trailing edge 33t of a cap 33 and rests at its upper right hand bead edge against the tapered conveying surface of cap 31. The broken line phantom can position illustration shows another possible clamped can position, which may because of machine vibration become unstable and slip downward a portion of the length of a cap 31 to positive supporting engagement by a trailing edge or edges as in the three solid line illustrated examples. Again, it will be appreciated that these are only illustrative examples of can conveying positions along the lowerator down-flow clamped runs of the conveyor assemblies 21 and also the spacing between the saw-toothed conveying surfaces may in this as in the elevator arrangement be greater or lesser as may be desirable for different containers, so as to afford increased or decreased end gripping action on the containers C, such as may be dictated by the different shapes and/or construction materials of the containers to be conveyed.

It will also be apparent that in view of the uniform saw-toothed surface formed by the chain and cap assemblies 21, it is not necessary in any of the embodiments of elevator or lowerator arrangements that caps 31 be directly opposed to like caps 31, and caps 33 opposed to like caps 33, such being shown in this fashion for simplicity of illustration and description, although it is most desirable and advantageous, although not absolutely essential for operation, that the sprocket wheels S1, S1 and S2, S2 have their teeth in lateral alignment whereby the saw-tooth conveying surfaces formed by the opposed facing caps 31, 33 will be in substantially laterally aligned opposed heel-and-toe relationship for most effective conveying action of containers C.

Figure 19:
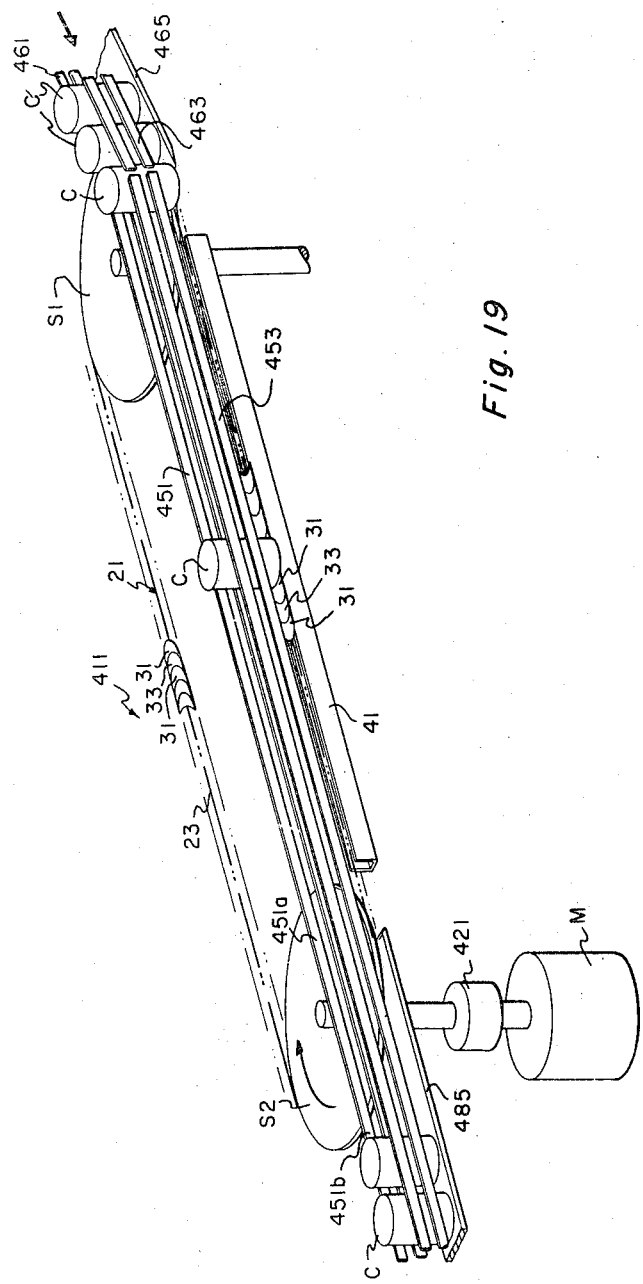
FIG. 19 is a schematic perspective view of a horizontal single chain conveyor according to the invention.
Figure 20:
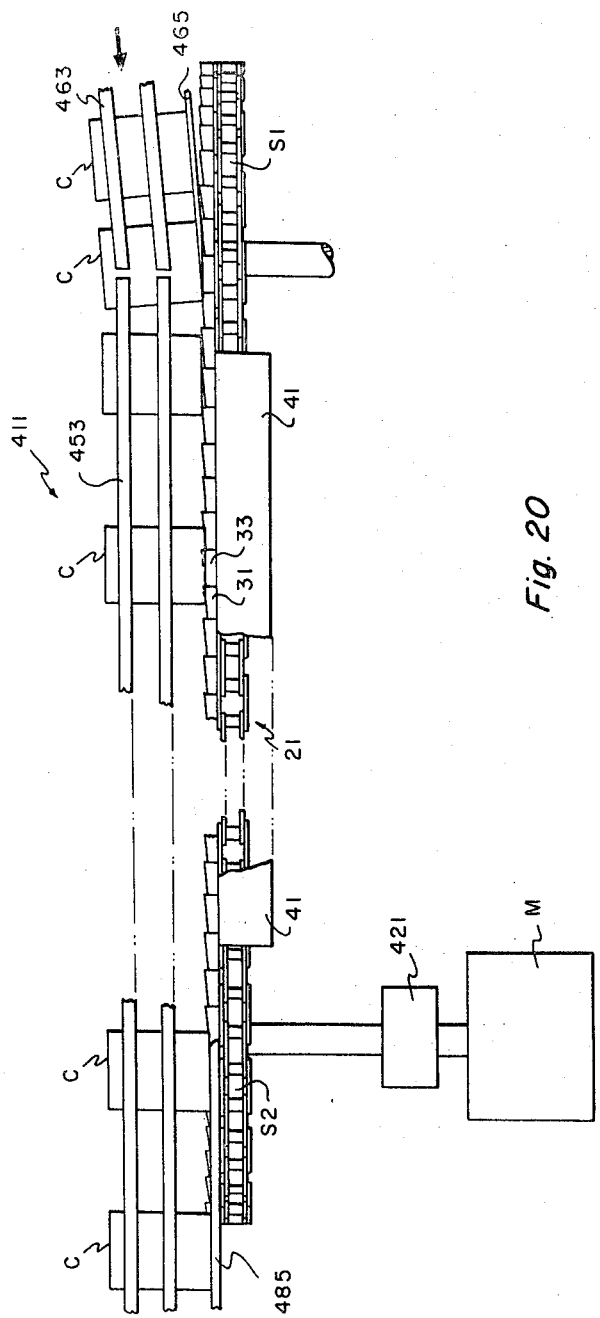
FIG. 20 is a front schematic view of the embodiment of FIG. 19.

In FIGS. 19 and 20 is schematically shown a horizontal conveyor generally indicated at 411, in which a single endless conveyor band assembly 21 of chain 23 and caps 31, 33 is employed to form a horizontal, saw-toothed upward facing conveying surface which is horizontally articulatable to form a wide variety of desired horizontal flow paths, including curves, reverse curves, and straight lines, the illustrative example showing a simple straight line container-conveying path. This desired straight line can conveying path is formed by a run of chain and cap assembly 21 engaging and supported by a straight length of channel guide 41 extending between idler entrance sprocket wheel S1 and exit sprocket wheel S2, which is suitably driven as by a motor M through a suitable drive convection generally indicated at 421, and which may include a speed reducer if desired.

In this embodiment the cans C are fed to the conveying run by a gravity track chute formed by inclined plate 465 and side guide rails 461, 463, which may be supported by suitable conventional means not shown. The lower exit end of chute track 465 is disposed slightly above and in feeding alignment with the beginning of the straight conveying run of conveying assembly 21, and to this end the lower exit edge of gravity track 465 may be tapered or feathered to enable close positioning of the upper conveying surface thereof to the sawtoothed surface formed by chain and cap conveyor assembly 21. In the illustrated example, the entrance edge of the exit chute plate is concavely curved to fit closely adjacent sprocket wheel S2, and is also rounded or beveled on its upper entrance edge to aid in preventing container jamming at this exit junction.

Figure 21:
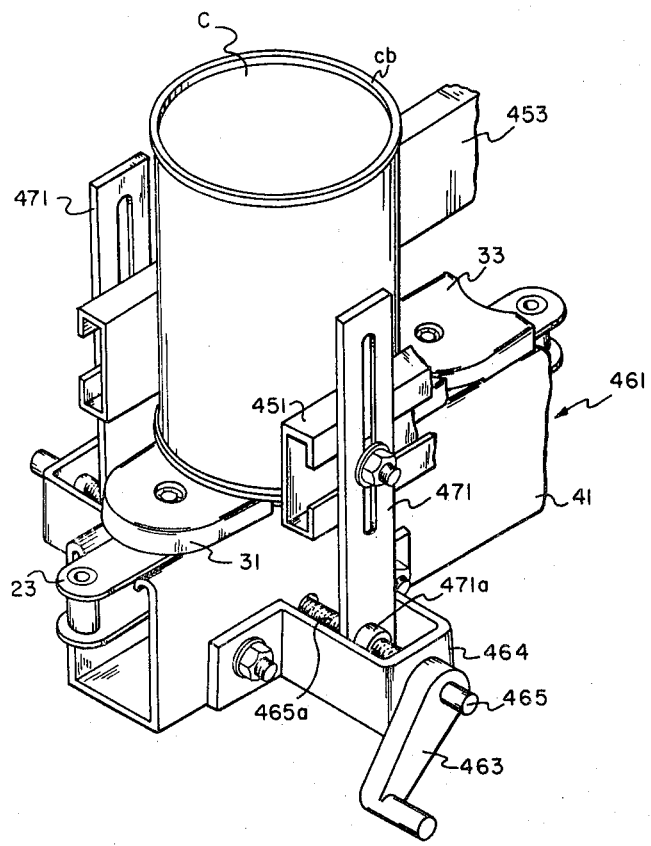
FIG. 21 is a fragmentary view of a can-diameter adjustment arrangement for the horizontal single chain conveyor of FIG. 19.

Lateral adjustment of the guides 451, 453 in horizontal conveyor 411 for different diameter cans may be effected as by several horizontally spaced apart diameter adjustment arrangements as shown at 461 in FIG. 21. This arrangement is constructed and operates essentially the same as the individual diameter adjustment assemblies 61 of FIGS. 1, 2 and 15, which are used for elevator and lowerator arrangements, and will therefore not be further described.

Figure 22:
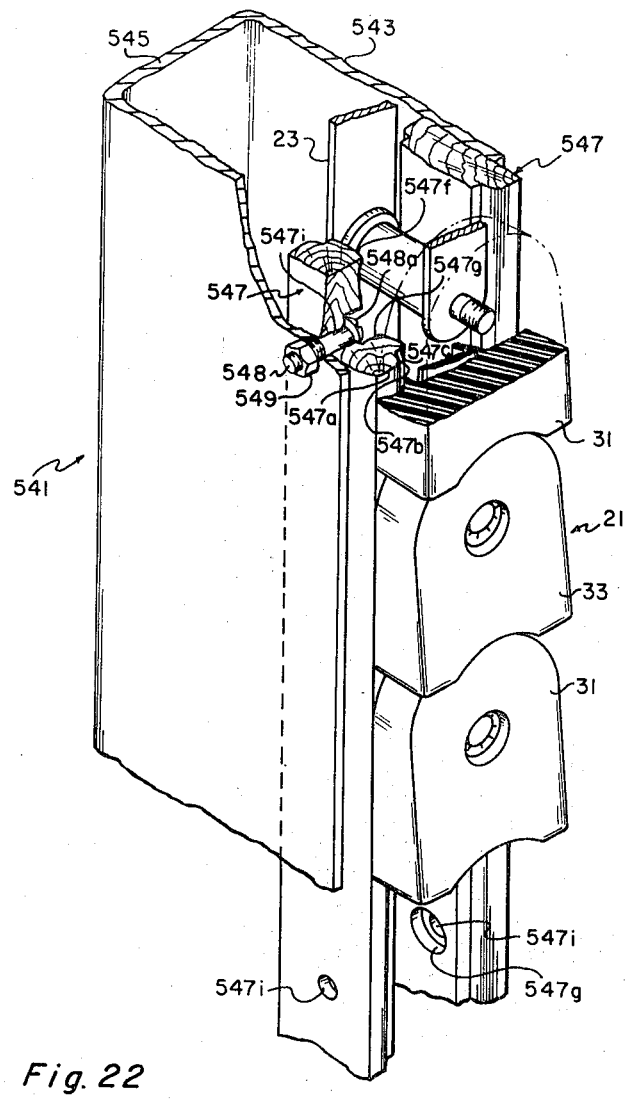
FIG. 22 is a fragmentary view, in partial section, of a modified and preferred chain guiding arrangement according to the invention.
Figure 23A:
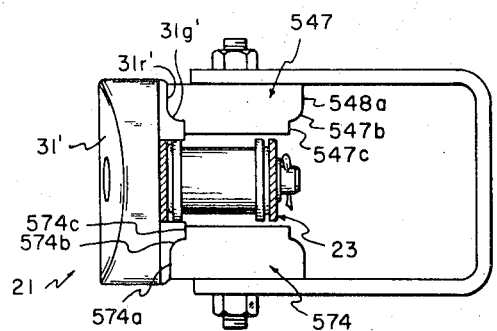
FIG. 23A is a view similar to FIG. 23, illustrating a preferred modification of the conveying caps used in conjunction with the modified replaceable reversible guide strip arrangement of FIGS. 22–24.
Figure 23B:
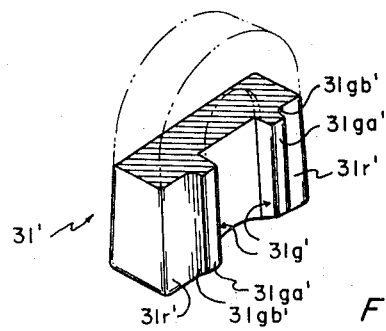
FIGS. 23B and 23C are perspective view, partially in phantom for emphasis of modification, of modified conveying caps of the modified embodiment of FIG. 23A.
Figure 23C:
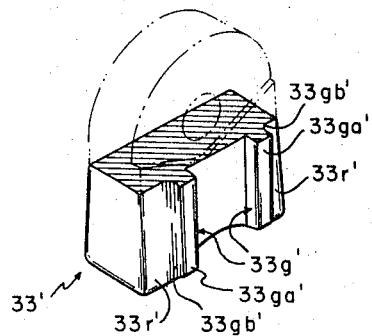
Figure 23:
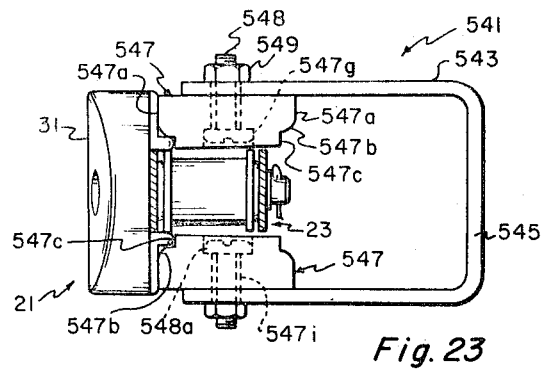
FIG. 23 is an end view of the chain and cap guiding arrangement of FIG. 22.
Figure 24:
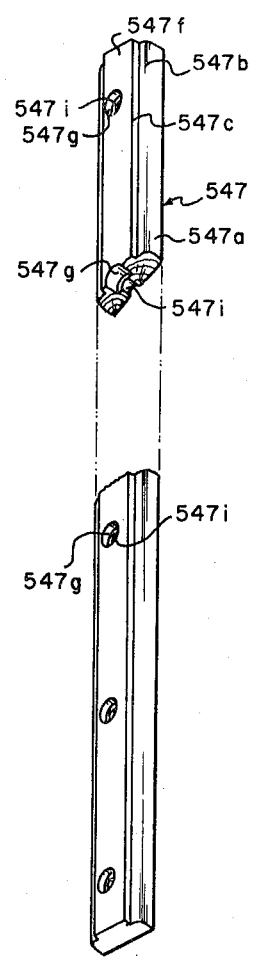
FIG. 24 is a perspective view, with a fragment broken away for clarity of illustration, of the reversible guide strip of FIGS. 22 and 23.

A modified and normally preferred channel guide arrangement 541 for endless band conveyor assemblies 21 is shown in FIGS. 22-24, for use in lieu of channel guide 41. In this guide embodiment 541 a conventional metal U-channel member 543, 545, 543 provides basic rigidity and the parallel legs 543, 543 serve as support mounts for two reversible and replaceable guide strips 547, 547 which are secured to the channel leg walls 543, 543, respectively, as by screws 548 and nuts 549, each of the screws having a flanged head 548a fitting within a respective counterbore 547g aligned with screw receiving bore 547i. Each of the strips 547 are formed with two opposed guide surfaces 547a, 547b, 547c in symmetrical generally mirror image relation, separated by a common flat surface 547f in which the bores 547i and counterbores 547g are formed for removably securing the strips 547 to the U-channel leg walls 543.

In the mounted position the guide surfaces 547a extend substantially beyond the adjacent respective edge surface of channel legs 543, so as to permit a large amount of wearing erosion of the guide strip guide surfaces 547a-c by caps 31, 33 before necessitating reversal or replacement thereof. The spacing and size of the guide surfaces 547a-c is preferably such that the surfaces 547a and 547c serve respectively as running and load bearing surfaces for the outer flat runner bearing surfaces 31r, 33r and raised guides 31g, 33g of caps 31, 33, and intermediate rounded guide surfaces 547b serve in lateral centering guiding relation with the raised parallel guide walls 31g, 33g.

By forming the reversible and replaceable guide strips 547 of relatively softer or more easily erodable wear material than the running undersurface 31r', 33r', 31g' of caps 31', 33' the guide strips may be made to take the major frictional wear and thereby prolong the life of the caps 31, 33 as well as providing for inexpensive replacement of the wear guide surfaces on which the caps 31, 33 ride along the channel guides therefor. To this end, the symmetrical guide strips 547 may be preferably and advantageously formed of an oil impregnated hardwood or softwood, a suitable oil impregnated wood raw product being marketed under the trade name of Arguto. Various other suitable wear materials, such as graphite impregnated resins, may be used; however, oil impregnated wood has at present been found to be very much the most advantageous in providing suitable low coefficient of friction, smooth bearing wear surface, long wear life and inexpensive replacement.

While the caps 31, 33 of the preceding embodiments may be used with the replaceable guide strip channel 541 as shown in FIGS. 22 and 23, if desired, it is however preferred to employ a modified cap configuration in which the caps 31', 33', are similar respectively to caps 31, 33 in all respects except that the load bearing and centering running undersurfaces 31r', 31g' and 33r', 33g' are substantially fully complementary to the guide strip surfaces 547a, 547b, 547c at their mating interfaces, as shown in FIGS. 23A, 23B and 23C. Thus, the effective running load bearing guide surfaces 31r' and 33r' are parallel and flat, as are the spaced load bearing running undersurfaces 31ga', 33ga', while the intermediate arcuately rounded opposed combined centering and load bearing guide undersurfaces 31gb', 33gb' are arcuately concave, all being complementary in running mated mated relationship with the corresponding interfacing guide surfaces 547a, 547b, 547c on guide strips 547. This provides most advantageous distribution of bearing load across substantially the full guide surface 547a, 547b, 547c, even wear, and smooth firmly centered guiding of the chain and cap conveying assembly 21 by the combined centering and load bearing guiding action of the generally out-splayed arcuate interfacing guide surfaces 547b.

Figure 26:
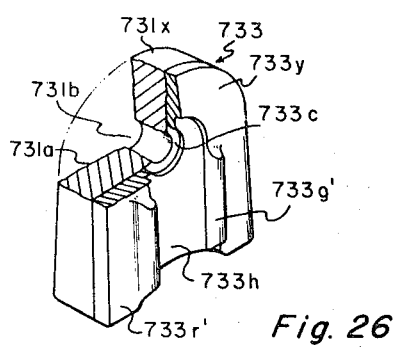
FIGS. 26 and 27 are perspective views, partially broken away for clarity, of modified conveying caps.
Figure 27:
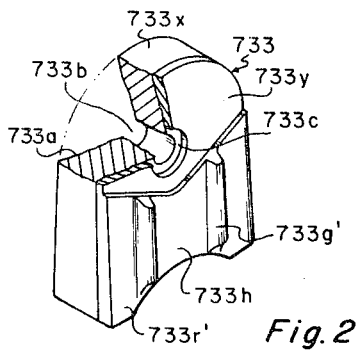

FIGS. 26 and 27 illustrate a further modified form of cap construction, an example of which is shown for each of caps 31 and 33 as respectively caps 731 and 733. In these modified constructions the caps are formed of two different materials by providing two layers 731x, 731y and 733x, 733y bonded or otherwise suitably secured together at their interface zone. The upper layers 731x, 733x form the tapered cap conveying surfaces 731a, 733a respectively, and lower layers 731y, 733y form the guide running surfaces 731r, 731g and 733r, 733g as well as the bottoms of channels 731h and 733h. As it is normally desirable that the container conveying surfaces 731a, 733a be of relatively high coefficient of friction and have long sliding wear characteristics, as well as good impact and load bearing characteristics, as well as good impact and load bearing characteristics, suitable materials for upper layers 731x, 733x may be found in nylon, Delrin acetal resin, polyurethanes, polycarbonates, and glass fiber filled combinations of these materials. The guide running surfaces 731r, 731g and 733r, 733g are desirably of low coefficient of friction with good load bearing capability and sliding wear resistance, and to this end suitable materials for the lower layers 731y, 733y may be found in polyfluorethylene fiber filled acetal resin composites, and nylon impregnated with molybdenum disulfide or graphite (such as are marketed under the trademarks Nylatron and Rulon).

While the invention has been illustrated and described with respect to several physical embodiments thereof, it will be apparent to those skilled in the art that various modifications and improvements may be made without departing from the scope and spirit of the invention. Accordingly, it is to be understood that the invention is not to be limited by the particular illustrative embodiments, but only by the scope of the Claims.

I claim:

1. A chain conveyor arrangement for conveying a plurality of containers such as cans arranged in a line comprising two endless articulated chains each being formed of a plurality of links, a plurality of associated conveying caps secured to the links of each chain to define two sets of caps, said caps being mounted on said chains with the caps secured in fixed relationship thereto, means for spacing said chains in substantially parallel relationship along a conveying run thereof, means for moving the chains along said conveying run, said sets of caps facing one another and being spaced apart, each of said caps having a conveying surface opposite said chain and which is unidirectionally tapered in the longitudinal direction of said chain to form a generally sawtoothed discontinuous conveying surface for conveying a plurality of containers arranged in a line, said caps further having oppositely outer faces, and corresponding associated guides engaging oppositely outer faces of said caps and maintaining said chain and associated caps in substantially parallel path spaced relation along and on opposite sides of a desired first article-conveying path.

2. A chain conveyor according to claim 1,
and second guides engaging said link chains and directing said link chains and associated caps along respective desired paths along and on opposite sides of a second desired article-conveying path,
said second guides being equally canted with respect to the longitudinal center line of said second desired article conveying path to thereby effect corresponding canted paths for said link chains and associated caps along said second article conveying path.

3. A chain conveyor according to claim 2,
said second guides being equally arcuate along said second article conveying path and said second article conveying path being similarly arcuate.

4. A chain conveyor according to claim 3,
said second guides being sprocket wheels having their axes inclined with respect to the longitudinal center line of said second article conveying path.

5. A chain conveyor according to claim 4,
said sprocket wheel axes being substantially equally inclined with respect to the longitudinal center line of said second article conveying path.

6. A chain conveyor according to claim 5,
and an article conveying chute disposed in feeding relation to said sets of caps in the zone of said second arcuate article conveying path and having its chute exit to said sets of caps adjacent the wider open portion of said second arcuate conveying path, the direction of feed of said chute being in the direction of convergence of said link chains and associated sets of caps along said second arcuate article conveying path.

7. A chain conveyor according to claim 6,
the first said article conveying path being linear and steeply inclined to the horizontal, and said second article conveying path being disposed below and in connecting feeding relation to said first article conveying path.

8. A chain conveyor according to claim 7,
said first article conveying path being substantially vertical.

9. A chain conveyor according to claim 8,
and article discharge means and an associated article conveying discharge chute disposed adjacent said first article conveying path in spaced apart relation from and above said second article conveying path.

10. A chain conveyor according to claim 9,
said article discharge means comprising a path interference cam surface extending into the path of motion of articles along said first article conveying path and at an acute angle to said first article conveying path to effect cammed discharge of said articles into said discharge chute as a function of article motion along said first path.

11. A chain conveyor according to claim 10,
the interfacing conveying surfaces at the leading edges of said caps being spaced apart further than at the trailing edge surfaces thereof along said parallel path travel of said chains and sets of associated caps.

12. A chain conveyor according to claim 6,
said article conveying chute and said second arcuate article conveying path being disposed above said first article conveying path, said first article conveying path being downwardly inclined,
and the interfacing conveying surfaces at the leading edges of said caps being spaced further apart than at the trailing edge surfaces thereof.

13. A chain conveyor according to claim 12,
and article discharge means and an associated article conveying discharge chute being disposed adjacent said first arcuate article conveying path and in spaced apart relation from and below said second article conveying path.

14. A chain conveyor according to claim 13,
said article discharge means comprising an interference cam surface disposed in the path of motion of articles along said first article conveying path and at an acute angle to said first path to effect cammed discharge of said articles into said discharge chute.

15. A chain conveyor according to claim 1,
the interfacing conveying surfaces at the leading edges of said caps on said two chains being spaced further apart than at the trailing edge surfaces thereof.

16. A conveyor according to claim 15,
said guides being parallel channel guides each having a generally U-channel configuration with a central longitudinal groove and two spaced legs connected by a bottom web,
each of said caps having two longitudinal guide runner surfaces disposed on opposite lateral sides of said chain and riding in sliding engagement with the two spaced leg edge surfaces of said channel guides, said chain riding in spaced relation within said channel.

17. A conveyor according to claim 16,
said guide runner surfaces on each said cap being bounded on their respective laterally inner sides adjacent said chain by protruding parallel guide walls extending into the respective said channel guide and maintaining said chain and associated caps in desired lateral relation with said channel with said chain being suspended in spaced relation from the side walls of said channel and sliding guide surface wear being taken by said caps.

18. A chain conveyor according to claim 6,
and an article conveying chute disposed in gravity feeding relation to said caps at a zone above said second arcuate article conveying path,
and an article conveying gravity chute disposed adjacent said second arcuate article conveying path and having its chute entrance adjacent the wider open portion of said second arcute conveying path, the direction of feed into said chute being in the direction of divergence of said link chains and associated sets of caps along said second article conveying path.

19. A chain conveyor according to claim 18,
and third arcuate guides comprising sprocket wheels engaging said link chains and directing said link chains and associated caps along desired respective parallel arcuate paths on opposite sides of a third arcuate article conveying path disposed above said first and second article conveying paths,
said sprocket wheels being coaxial, and said article conveying gravity feeding chute having its exit disposed in feeding relation into said third arcuate article conveying path.

20. A conveyor arrangement according to claim 1,
said guide means comprising a pair of spaced parallel centering and load bearing guide rails engaged by the interfacing undersurface of said conveying caps,
said guide rails forming laterally opposed centering guide surfaces and further load bearing guide surfaces,
each of said caps having an undersurface in cross-sectional complementary running sliding relation with both of said laterally opposed centering guide surfaces and further load bearing guide surfaces.

21. A conveyor arrangement according to claim 20,
said laterally opposed centering guide surfaces being canted in out-splayed facing relation to said cap undersurfaces and forming combined lateral centering and load bearing guide surfaces engaging with complementary interfacing running undersurfaces on said conveying caps.

22. A conveyor arrangement according to claim 21,
said further load
bearing surfaces on each of said rails including first and second substantially flat and parallel load bearing surfaces joined by their respective canted out-splayed combined centering and load bearing surfaces,
said second further load bearing surfaces being disposed laterally inboard of said first further load bearing surfaces and being parallel thereto and lying a different plane therefrom at a given longitudinal location thereof.

23. A conveyor arrangement according to claim 22,
said canted out-splayed combiend centering and load bearing surfaces being smoothly arcuately convexly curved in cross-section along their length.

24. A conveyor arrangement according to claim 23,
and support guide means for said guide rails,
said guide rails each having reversible substantially identical guide surfaces forming two substantially identical sets of said load bearing and centering guide surfaces,
and means removably securing each of said guide rails to said guide support means, with a respective selected one of said sets of load bearing and centering guide surfaces facing and in engagement with the adjacent interfacing complementary running underfaces of said conveying caps.

25. A conveyor arrangement according to claim 24,
said guide rails being symmetrical in cross-section and formed of lubricant-impregnated wear resistant solid material.

26. A conveyor arrangement according to claim 25,
said guide rails being oil-impregnated wood strips,
said guides having mirror spaced mounting holes therein,
said guide rail securing means comprising threaded male securing elements extending through said mounting holes and in securing relation with said guide support means.

27. A conveyor arrangement comprising:
two opposed parallel closed flexible supporting loops each having a conveying surface assembly carried thereby for following throughout a linear path traversed by said loop,
means for linearly traversing said loop through a selected closed path,
guide support means,
guide means for establishing a major portion of said closed path mounted on said guide support means,
said guide means comprising a pair of spaced guides defining a longitudinal recess therebetween, and within which recess said loop is guided,
each of said guides having reversible substantially identical first and second guide surfaces for load bearing and lateral centering engagement by said conveying surface assembly during passage of said supporting loop and conveying surface assembly past said guides,
and means removably securing each of said guides to said guide support means with a respective selected one of said first and second guide surfaces facing and in engagement with the adjacent section of said conveying surface assembly, and said closed flexible supporting loop being disposed in spaced relation between said guides,
said closed flexible supporting loop comprising an endless chain of articulated chain links interconnected by pins,
said conveying surface comprising a plurality of articulated cap elements secured to said links by said pins,
each of said cap elements having a tapered article conveying surface and an opposite guide-engaging surface riding on and between said guides,
said article conveying surfaces of said caps forming a generally saw-toothed discontinuous conveying surface.

28. A conveyor arrangement according to claim 27,
said guides being straight and extending along a longitudinal conveying rim of said loop and conveying surface assembly.

29. A conveyor arrangement according to claim 27,
said guides being symmetrical in cross section.

30. A conveyor arrangement according to claim 29,
said first and second guide surfaces on said guides each including oppositely facing load bearing surfaces and a respective adjoining lateral centering surface, said lateral centering surfaces on each said guide facing in the same lateral direction and facing the centering surfaces on the other said guide.

31. A conveyor arrangement according to claim 30, said first and second guide surfaces each further including a second pair of oppositely facing load bearing surfaces spaced from one of the first mentioned said load bearing surfaces by the respective said lateral centering surface, said second pair of oppositely facing load bearing surfaces being spaced apart a lesser distance than said first mentioned load bearing surfaces, said conveying surface assembly riding in load bearing relation with each of the selected said load bearing surface and in lateral guiding and centering relation between said centering surfaces.

32. A conveyor arrangement according to claim 31, said guides being a substantially mirror pair of strips of lubricant-impregnated wear-resistant solid material.

33. A conveyor arrangement according to claim 32, said guides being strips of lubricant-impregnated cellular material.

34. A conveyor arrangement according to claim 33, said guides being oil-impregnated wood strips, said strips having mirror-spaced mounting holes therein, said guide securing means comprising threaded male securing elements extending through said mounting holes and in securing relation with said guide support means.

35. A conveyor arrangement according to claim 27, said guides being a substantially mirror pair of strips of lubricant-impregnated wear-resistant solid material.

36. A conveyor arrangement according to claim 35, said guides being oil-impregnated wood strips, said strips having mirror-spaced mounting holes therein along their length, said guide securing means comprising threaded male securing elements extending through said mounting holes and in securing relation with said guide support means.

* * * * *